United States Patent
Fitzmaurice et al.

(10) Patent No.: US 8,904,310 B2
(45) Date of Patent: *Dec. 2, 2014

(54) PEN-MOUSE SYSTEM

(75) Inventors: George W. Fitzmaurice, Toronto (CA);
Gordon Kurtenbach, Toronto (CA);
William A. Buxton, Toronto (CA);
Robert J. Pieke, Toronto (CA)

(73) Assignee: Autodesk, Inc., San Rafael, CA (US)

(*) Notice: Subject to any disclaimer, the term of this patent is extended or adjusted under 35 U.S.C. 154(b) by 1113 days.

This patent is subject to a terminal disclaimer.

(21) Appl. No.: 11/754,019

(22) Filed: May 25, 2007

(65) Prior Publication Data

US 2007/0226657 A1  Sep. 27, 2007

Related U.S. Application Data

(63) Continuation of application No. 10/684,581, filed on Oct. 15, 2003.

(60) Provisional application No. 60/419,144, filed on Oct. 18, 2002.

(51) Int. Cl.
| | |
|---|---|
| *G06F 3/00* | (2006.01) |
| *G06F 3/0488* | (2013.01) |
| *G09G 5/14* | (2006.01) |
| *G09G 5/08* | (2006.01) |

(52) U.S. Cl.
CPC ............ *G06F 3/0488* (2013.01); *G09G 5/14* (2013.01); *G09G 5/08* (2013.01)
USPC .......... 715/861; 715/856; 715/857; 715/858; 715/859; 715/860

(58) Field of Classification Search
USPC ............................................... 715/856–862
See application file for complete search history.

(56) References Cited

U.S. PATENT DOCUMENTS

| | | |
|---|---|---|
| 4,720,703 A | 1/1988 | Schnarel, Jr. et al. |
| 4,931,783 A | 6/1990 | Atkinson |

(Continued)

OTHER PUBLICATIONS

Polital Enterprises, Point-N-Click virtual mouse, pp. 1-9, Dec. 1, 2001.*

(Continued)

*Primary Examiner* — Ryan Pitaro
(74) *Attorney, Agent, or Firm* — Staas & Halsey LLP

(57) ABSTRACT

The present invention is a system that provides a pen based computer user with a graphical user interface tool, a pen-mouse, that looks like and functions like a mouse but that is controlled by a limited input device such as a pen or stylus of the pen based computer. The pen-mouse is a tracking menu that tracks the position of the pen. A pen cursor that corresponds to the pen is allowed to be moved about within the pen-mouse graphic by the pen and the pen-mouse remains stationary. The pen-mouse is moved when the location of the pen encounters a tracking boundary of the pen-mouse. The tracking boundary typically coincides with the graphic representing the mouse. While moving within the pen-mouse, the pen can select objects within the pen-mouse body, such as buttons, wheels, etc. The selection of a button or other virtual control causes a corresponding computer mouse button function to be executed. The execution focus is directed at any object designated by a pen-mouse tracking symbol, such as an arrow, that is part of the pen mouse graphic. The pen-mouse can emulate functions or operations of a mouse including single button clicks, double button clicks, finger wheels, track balls, etc.

10 Claims, 15 Drawing Sheets

(56) References Cited

U.S. PATENT DOCUMENTS

| | | | |
|---|---|---|---|
| 5,276,795 A | 1/1994 | Hoeber et al. | |
| 5,500,936 A | 3/1996 | Allen | |
| 5,581,670 A | 12/1996 | Bier et al. | |
| 5,627,960 A | 5/1997 | Clifford | |
| 5,634,064 A | 5/1997 | Warnock et al. | |
| 5,638,523 A | 6/1997 | Mullet et al. | |
| 5,666,499 A | 9/1997 | Baudel et al. | |
| 5,689,667 A | 11/1997 | Kurtenbach | |
| 5,760,773 A | 6/1998 | Berman et al. | |
| 5,798,752 A | 8/1998 | Buxton et al. | |
| 5,828,360 A | 10/1998 | Anderson | |
| 6,018,336 A * | 1/2000 | Akiyama et al. | 345/173 |
| 6,037,937 A * | 3/2000 | Beaton et al. | 715/764 |
| 6,057,844 A * | 5/2000 | Strauss | 715/863 |
| 6,097,387 A | 8/2000 | Sciammarella et al. | |
| 6,118,427 A | 9/2000 | Buxton et al. | |
| 6,154,214 A * | 11/2000 | Uyehara et al. | 715/863 |
| 6,181,344 B1 * | 1/2001 | Tarpenning et al. | 715/863 |
| 6,246,411 B1 * | 6/2001 | Strauss | 715/863 |
| 6,262,719 B1 | 7/2001 | Bi et al. | |
| 6,369,837 B1 | 4/2002 | Schirmer | |
| 6,549,219 B2 | 4/2003 | Selker | |
| 6,791,536 B2 * | 9/2004 | Keely et al. | 345/173 |
| 6,865,719 B1 | 3/2005 | Nicholas, III | |
| 6,918,091 B2 | 7/2005 | Leavitt et al. | |
| 6,938,221 B2 * | 8/2005 | Nguyen | 715/863 |
| 7,058,902 B2 | 6/2006 | Iwema et al. | |
| 7,319,454 B2 * | 1/2008 | Thacker et al. | 345/163 |
| 7,395,515 B2 * | 7/2008 | Konar et al. | 715/858 |
| 7,477,233 B2 * | 1/2009 | Duncan et al. | 345/156 |
| 2001/0009428 A1 | 7/2001 | Dow et al. | |
| 2002/0085037 A1 | 7/2002 | Leavitt | |
| 2002/0101458 A1 | 8/2002 | SanGiovanni | |
| 2002/0122029 A1 * | 9/2002 | Murphy | 345/173 |
| 2002/0175955 A1 | 11/2002 | Gourdol | |
| 2002/0186351 A1 * | 12/2002 | Gnanamgari et al. | 353/42 |
| 2005/0179645 A1 * | 8/2005 | Lin et al. | 345/156 |
| 2006/0010402 A1 * | 1/2006 | Undasan | 715/861 |
| 2009/0100366 A1 * | 4/2009 | Fitzmaurice et al. | 715/767 |

OTHER PUBLICATIONS

Microsoft, screen captures from "Microsoft Excel 2000", 2000, pp. 1-2.

Accot, J. Zhai, S. (2002), "More than dotting the I's—foundations for crossing-based interfaces", Proceedings of ACM CHI 2002, pp. 73-80.

Bier, E. A., Stone, M.C., Fishkin, K., Buxton, W., Baudel, T., (1994), "A Taxonomy of See Through Tools", Proceedings of the ACM CHI 1994, pp. 358-364.

Buxton, W., (1990), "A Three-State Model of Graphical Input", In D., Diaper et al. (Eds), Human-Computer Interaction—Interact '90., Amsterdam: Elsevier Science Publishers B.V., (North-Holland), pp. 449-456.

Buxton, W., Fitzmaurice, G., Balakrishnan, R., and Kurtenbach, G. (200), "From Traditional to Electronic Large Displays in Automotive Design", IEEE Computer Graphics and Applications, 20(4), pp. 68-75.

Callahan, J., Hopkins, D., Weiser, M. & Shneiderman, B. (1988), "An Empirical Comparison of Pie vs. Linear Menus", Proceedings of CHI '88, pp. 95-100.

Elrod, S., Bruce, R., Gold, R., Goldberg, D., Halasz, EG., Janssen, Jr., W.C., Lee, D., McCall, K., Pedersen, E.R., Pier, K.A., Tang., and Welch, B., (1992), "Liveboard: A Large Interactive Display Supporting Group Meetings, Presentations, and Remote Collaboration", Proceedings of ACH CHI 1992, pp. 599-607.

Guimbretiere, F., Stone, M. & Winograd, T., (2001), "Fluid Interaction with High-Resolution Wall-size Displays", Proceedings of ACM UIST 2001, pp. 21, 30.

Guimbretiere, F., and Winograd, T., (2000), "FlowMenu: Combining Command, Text, and Data Entry", Proceedings of ACM UIST 2000, pp. 213-216.

Harrison, B., Kurtenbach, G., Vincente, K., (1995), "An Experiment Evaluation of Transparent User Interface Tools and Information Content", Proceedings of ACM UIST, 1995, pp. 81-90.

Harrision, B., Fishkin, K., Gujar A., Mochon, C., Want, R. (1998), "Squeeze me, hold me, tilt me! An Exploration of Manipulative User Interfaces", Proceedings of ACM CHI 1998, pp. 17-24.

Kramer, A., (1994), "Translucent Patches: Dissolving Windows", Proceedings of ACM UIST 1994, pp. 121-130.

Kurtenbach, G. & Buxton, W., (1993), "The limits of expert performance using hierarchical marking menus", Proceedings of the ACM CHI 1993, pp. 482-487.

Kurtenbach, G., Fitzmaurice, G., Baudel, T., Buxton, B., (1997), "The Design of a GUI Paradigm based on Tablets, Two-Hands, and Transparency", Proceedings of ACH CHI 1997, pp. 35-42.

Kurtenbach, G., (1993), The Design and Evaluation of Marking Menus, Ph.D., thesis, University of Toronto, Dept. of Computer Science.

Pook, S., Lecolinet, E., Vaysseix, G., and Barillot E. (2000), "Control Menus: Execution and Control in a Single Interactor", Proceedings of ACH CHI 2000 Extended Abstracts, pp. 263-264.

Rubio, J. M. and Janacek, P. (2002), "Floating Pie Menus: Enhancing the functionality of Contextual Tools", Proceedings of ACM UIST 2002 Conference Companion, pp. 39-40.

Venolia, D. and Neiberg, F. (1994), "T-Cube: A Fast, Self-Disclosing Pen-Based Alphabet", Proceedings of ACH CHI 1994, pp. 265-270.

Hopkins, D. (1991), "The Design and Implementation of Pie Menus", Dr. Dobbs Journal, 16(12), pp. 16-26.

Bederson, B.B. and Hollan, J. D. (1994), "Pad++: A Zooming Graphical Interface for Exploring Alternative Interface Physics", Proceedings of ACM UIST 1994, pp. 17-26.

Perlin, K. and Fox, D. (1993), "Pad: An Alternative Approach to the Computer Interface", Proceedings of ACM SIGGRAPH 1993, pp. 57-64.

MacKenzie, I.S. & Buxton, W. (1994), "Prediction of Pointing and Dragging Times in Graphical User Interfaces Interacting With Computer", 6(4), pp. 213-227.

Myers, B. & Buxton, W. (1986), "Creating Highly-Interactive and Graphical User Interfaces by Demonstration", Computer Graphics 20(3), Proceedings of SIGGRAPH '18, pp. 249-258.

Fitzmaurice et al., "Tracking Menus", Alias|Wavefront, pp. 1-10.

Fitzmaurice et al., "Tracking Menus", Proceedings from ACM CHI 2003, vol. 5, Issue 2, pp. 71-80.

U.S. Appl. No. 10/684,581, filed Aug. 25, 2003, Fitzmaurice, Autodesk, Inc.

U.S. Appl. No. 10/684,580, filed Oct. 15, 2003, Fitzmaurice, Autodesk, Inc.

U.S. Appl. No. 10/684,579, filed Oct. 15, 2003, Fitzmaurice, Autodesk, Inc.

Notice of Missing Parts mailed on Jan. 20, 2004 in corresponding U.S. Appl. No. 10/684,581.

US Office Action mailed on Apr. 18, 2006 in corresponding U.S. Appl. No. 10/684,581.

US Office Action mailed on Sep. 26, 2006 in corresponding U.S. Appl. No. 10/684,581.

Notice of Allowance mailed on Mar. 8, 2007 in corresponding U.S. Appl. No. 10/684,581.

Issue Notification mailed Jun. 20, 2007 in corresponding U.S. Appl. No. 10/684,581.

US Office Action mailed on Nov. 13, 2009 in corresponding U.S. Appl. No. 10/684,580.

Advisory Action mailed on Oct. 26, 2009 in corresponding U.S. Appl. No. 10/684,580.

US Office Action mailed on Dec. 11, 2008 in corresponding U.S. Appl. No. 10/684,580.

US Office Action mailed on May 14, 2008 in corresponding U.S. Appl. No. 10/684,580.

Advisory Action mailed on Oct. 25, 2007 in corresponding U.S. Appl. No. 10/684,580.

US Office Action mailed on Apr. 19, 2007 in corresponding U.S. Appl. No. 10/684,580.

US Office Action mailed on Jan. 20, 2010 in corresponding U.S. Appl. No. 10/684,579.

(56) References Cited

OTHER PUBLICATIONS

US Advisory Action mailed on Jan. 20, 2010 in corresponding U.S. Appl. No. 10/684,579.
US Office Action mailed on Dec. 11, 2008 in corresponding U.S. Appl. No. 10/684,579.
US Office Action mailed on Jun. 2, 2008 in corresponding U.S. Appl. No. 10/684,579.
US Advisory Action mailed on Oct. 25, 2007 in corresponding U.S. Appl. No. 10/684,579.
US Office Action mailed on Jun. 26, 2007 in corresponding U.S. Appl. No. 10/684,579.
US Office Action mailed on Oct. 13, 2006 in corresponding U.S. Appl. No. 10/684,579.
Adobe Photoshop 5, pp. 1-2, published 1998.

* cited by examiner

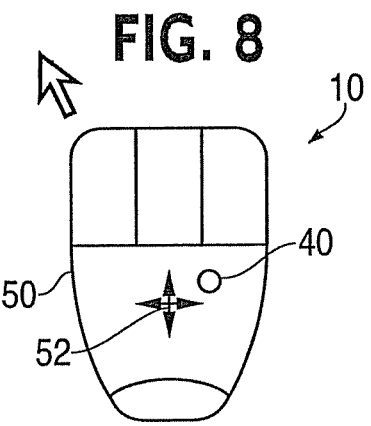
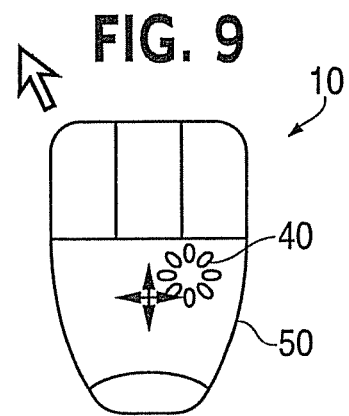
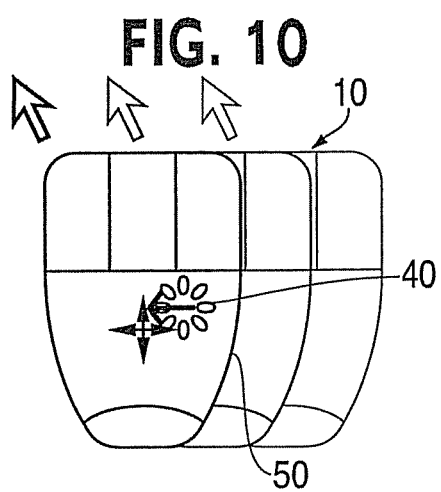

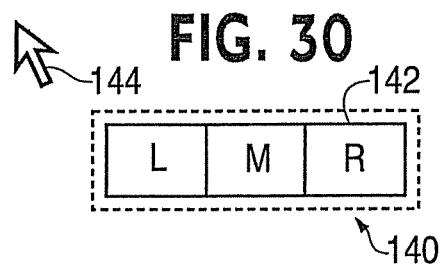
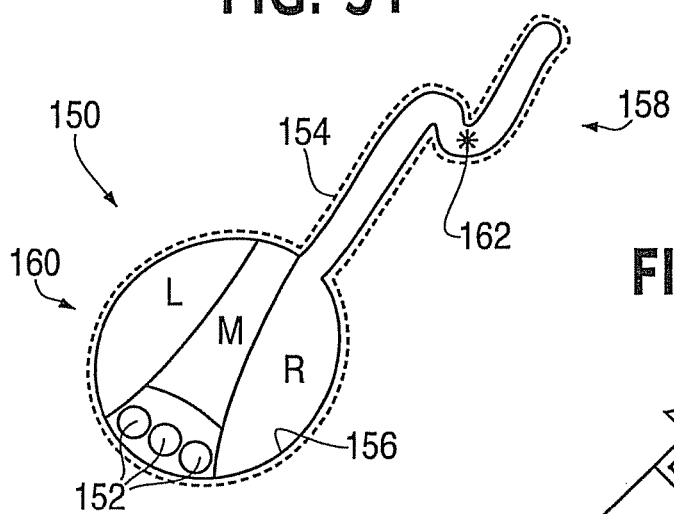
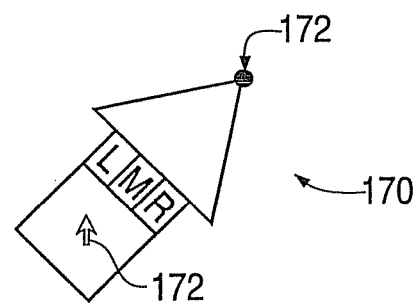
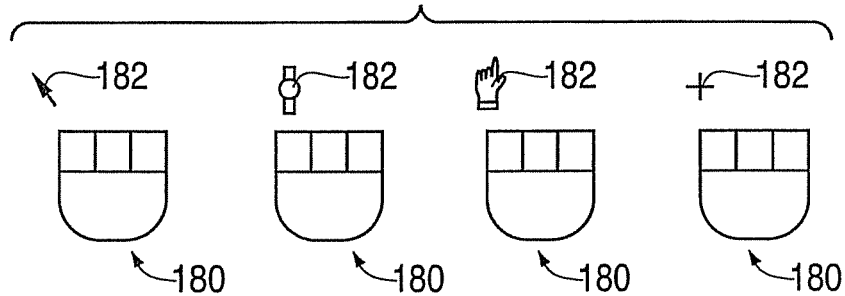

PEN-MOUSE SYSTEM

CROSS-REFERENCE TO RELATED APPLICATION(S)

This application is a continuation of U.S. patent application Ser. No. 10/684,581, filed Oct.15, 2003, now U.S. Pat. No. 7,242,387, which is related to and claims priority to U.S. provisional application entitled Tracking Menu System having Ser. No. 60/419,144, by Fitzmaurice et al, filed Oct. 18, 2002, this application is also related to U.S. application entitled Tracking Menu, System and Method having Ser. No. 10/684,580, by Fitzmaurice et al, filed Oct. 15, 2003, now U.S. Pat. No. 7,770,135 and to U.S. application entitled Pan-Zoom Tool having Ser. No. 10/684,579, by Fitzmaurice et al, filed Oct.15, 2003now U.S. Pat. No. 7,814,439, all of which are incorporated by reference herein.

BACKGROUND OF THE INVENTION

1. Field of the Invention

The present invention is directed to a tracking menu that can be used with a pen based computer and that provides a pen user the functionality of a mouse and, more particularly, to a pen-mouse that tracks a position of a pen or stylus, allows pointing like a mouse and emulates the functionality of mouse buttons and other mouse inputs, such as a finger rollable wheel.

2. Description of the Related Art

Stylus or pen-based computers, such as tablet (personal computers) PCs and personal digital assistants (PDAs) are becoming a popular type of computing device. These devices operate somewhat differently than the typical mouse-based computer systems. In the pen-based devices the user uses a stylus or pen to select and activate items, such as menu controls/buttons, as well as to perform graphic functions, such as drawing. In performing these different operations it is often the case that the user must move the pen to a menu to select a function and then return to the display area to perform the function. Because these pen-based operations are somewhat different from traditional mouse based operations, it can be helpful to a new user to have a familiar paradigm, such as a mouse, that can be used in pen-based computers to perform mouse type operations.

What is needed is an interface that provides a user with the look and "feel" of operation of a mouse and avoids the need to move to a menu to select mouse functions, such as left button, right button, scroll, etc.

SUMMARY OF THE INVENTION

It is an aspect of the present invention to provide a graphical user interface that emulates a mouse input device and is controlled by a pen of a pen based computer.

It is another aspect of the present invention to provide a mouse emulation that functions as a tracking menu.

It is also an aspect of the present invention is to provide mouse emulation that does not use keyboard events/signals but does emulate some keyboard keys (e.g., shift/alt)

The above aspects can be attained by a system that provides a pen based computer user with a tool, a pen-mouse, that functions like a mouse but that is controlled by a limited input device, such as a pen or stylus. The pen-mouse is a tracking menu that tracks the position of the pen. A pen-cursor that corresponds to the pen is allowed to move about within a pen-mouse graphic. The pen-mouse is moved when the location of the pen, pen cursor or pen transducer sensed position encounters a tracking boundary of the pen-mouse. While moving within the pen-mouse the pen can select objects within the pen-mouse such as buttons, wheels, etc. The selection of a button or other virtual control causes a corresponding mouse button function to be executed. The execution focus is directed at any object designated by a tracking symbol, such as an arrow, that is part of the pen-mouse graphic.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 8-10 depict the pen-mouse during pan tracking.

Figures 11, 12, 13:
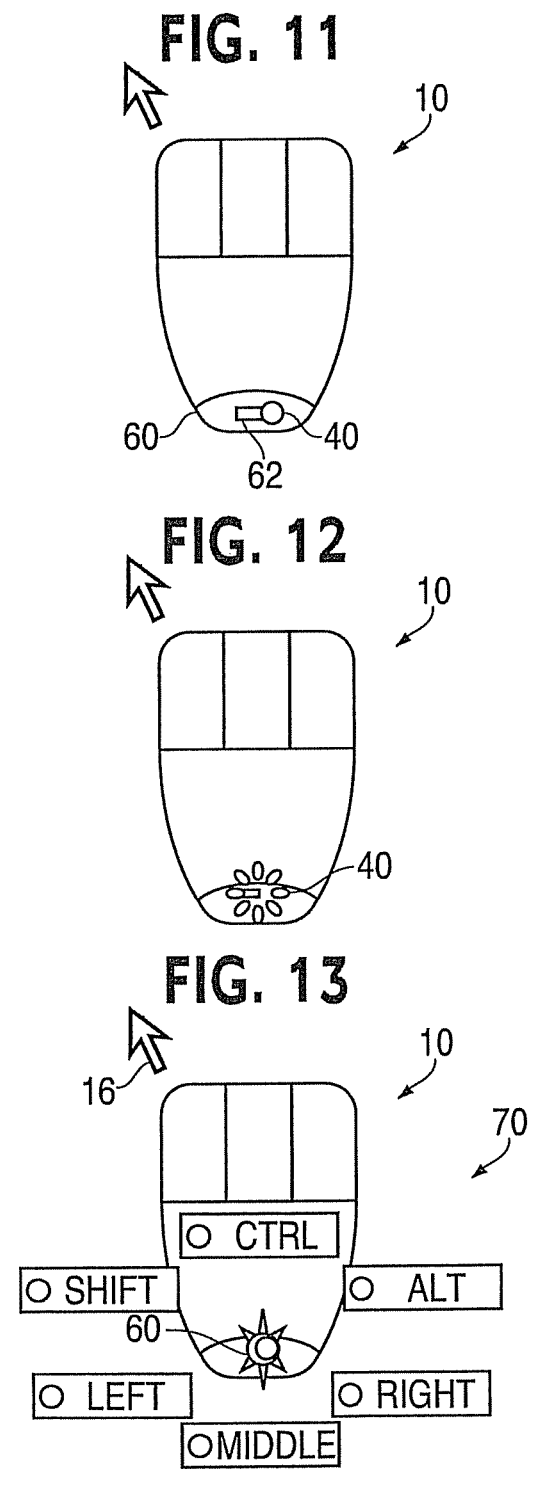

FIGS. 11 and 12 show the pen-mouse bar function highlighted and activated.

FIGS. 13-23 show marking menu activation and double button function activation

FIG. 30 shows a limited function and a limited graphic pen-mouse.

FIG. 31 shows a pen-mouse with activation safety features.

FIG. 32 shows an arrow shaped pen-mouse.

FIG. 33 shows pen-mouse tracking symbols changing according to system state.

DETAILED DESCRIPTION OF THE PREFERRED EMBODIMENTS

Figure 1:
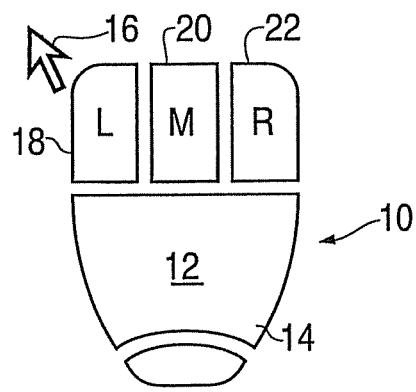
FIG. 1 illustrates a pen-mouse tracking menu according to the present invention.

The present invention is directed to a user interface, particularly, a graphical user interface (GUI) that has the appearance of a mouse 10 as depicted in FIG. 1. This interface 10, which for convenience will be called a pen-mouse, is a tracking menu where the pen-mouse 10 tracks the position of a stylus or pen being used with a pen-based computer. A tracking menu is a graphical user interface widget that is controlled by either a pen or mouse having an associated pen or mouse cursor where the cursors can be invisible. A tracking menu is invoked and dismissed in the same manner as a traditional modal tool by clicking on a tool palette or menu item. Like traditional menus, a tracking menu includes a cluster of graphical buttons or controls. The pen cursor can be moved within the menu to select and interact with items, such as the buttons. However, unlike traditional menus, when the pen cursor crosses the exterior edge or tracking boundary of the menu, the menu is moved to keep it under the cursor. The pen-mouse tracking menu, of the present invention, can track other types of input devices, such as a finger in a touch based menu, a traditional mouse and 3D input devices such as gloves. Additional details with respect to tracking menus can be found in the related application noted above.

The pen-mouse 10 preferably includes a mouse graphic 12 that includes a visible border or edge 14 and a traditional arrow cursor or tracking symbol 16. This pen-mouse tracking menu 10 tracks the position of the pen of the pen based computer system as will be discussed later in more detail. By moving the pen, the cursor 16 can be positioned to point at an object in the same way that a cursor for a mouse is positioned to point at an object. The mouse graphic 12 depicts three buttons 18 (left—L), 20 (middle—M) and 22 (right—R) that are conventional type virtual controls specifically for initiating mouse button down events when activated by a pen down event with the pen tip positioned over one of the buttons 18-22. The tracking symbol or cursor 16 behaves like a traditional tracking symbol used with a mouse where the tracking symbol can point at (be positioned over) an object, such as a menu, and activate the object when a mouse down event occurs. That is, conventional input mapping based on location of an input sensor or cursor are performed. As a result, when the cursor 16 is positioned over an activatable object and a pen down event occurs with the pen located over one of the buttons 18-22, a mouse down event for the corresponding mouse button occurs for the object at which the cursor points. In this way, the pen of the pen-based computer system can be used to perform the same functions as a mouse in a mouse based computer system.

Figure 2:
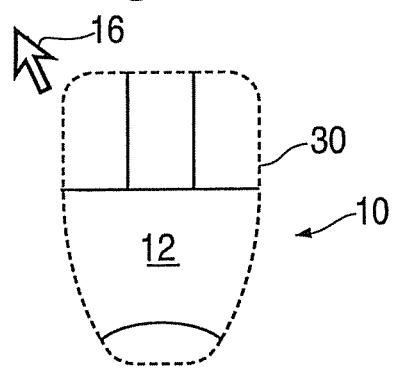
FIG. 2 depicts a tracking border of the pen-mouse.

The pen-mouse tracking menu 10, as depicted in FIG. 2, includes a tracking menu tracking boundary 30 that allows the pen cursor 16 to move within the tracking menu 10 without causing the menu to pen-mouse 10 to move with the movement of the pen. The boundary 30 is shown as coinciding with the visible edge of the graphic 12 but need not be so coincident (see FIG. 27).

Figure 3:
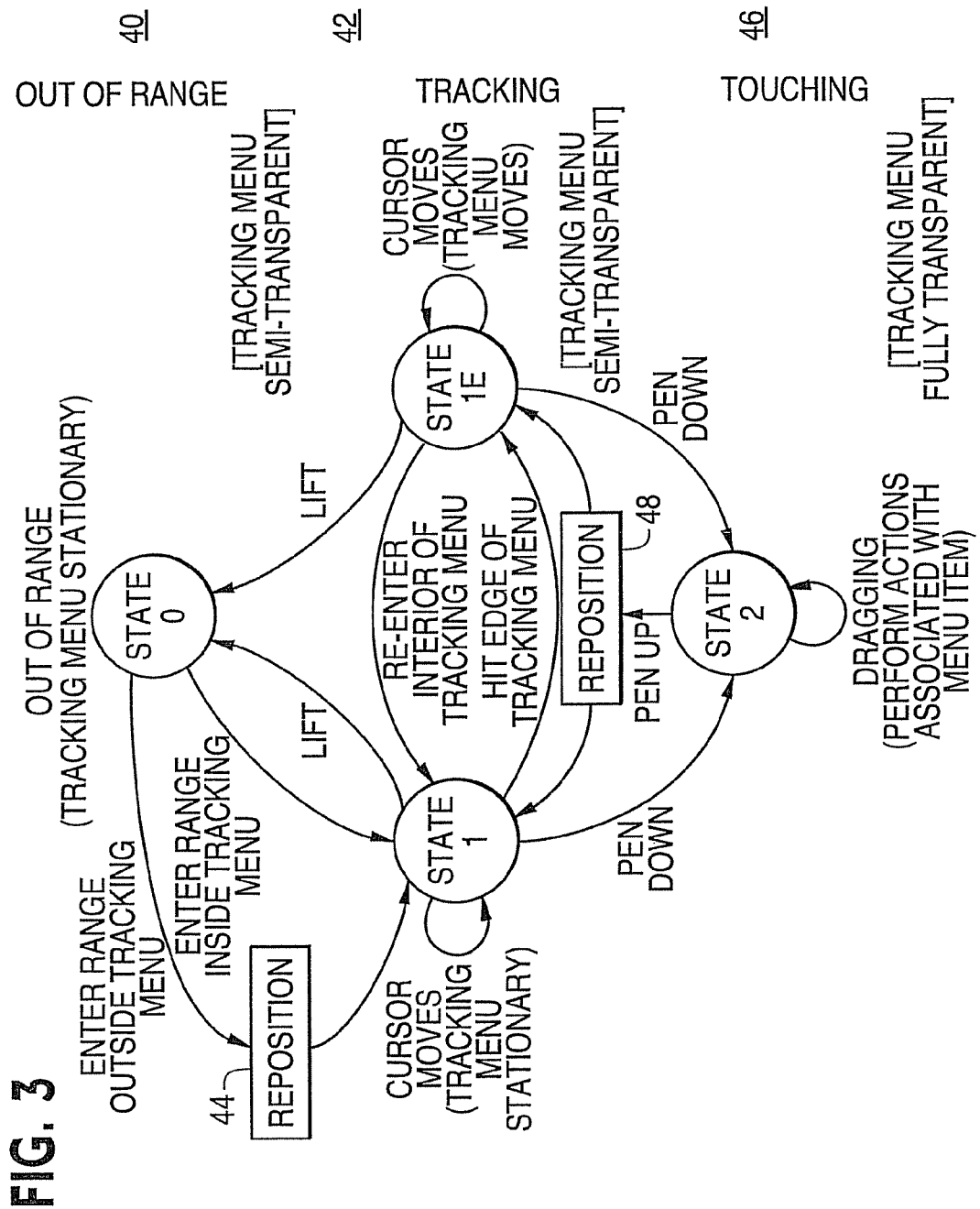
FIG. 3 illustrates tracking states.

The operation of the pen-mouse tracking menu 10 of the present invention can be understood using a state diagram as depicted in FIG. 3. In state 0 the pen is out-of-range 40 of the tracking system of the pen based computer, such as a tablet PC, and the tracking menu 10 is visible (preferably semi-transparent) and is positioned in the last place it resided before the pen moved out-of-range or in an initial position if the tracking menu has just been involved. The state 0 is entered from states 1 and 1E when the pen is lifted from the tablet and moved out-of-range. The menu 10 resides in this last position until the pen is brought back into range and the tablet PC begins tracking the pen.

The pen can move into tracking range 42 and enter state 1 in two different ways. In the first into-range transition, the pen comes down at a position where the tip of the pen is outside of the tracking menu edge or tracking boundary 30. When tracking starts in this condition, the menu 10 is moved or repositioned 44 so that the cursor is inside the menu edge. This involves conventionally redrawing the semi-transparent menu 10 at a position corresponding to the pen tip, cursor or sensed pen transducer position. This repositioning or redrawing can place the menu 10 such that the menu 10 is moved the minimum distance to place the pen cursor just within the edge of the menu 10. Or the repositioning can place the menu at an arbitrary position under the cursor, such as positioning the menu with the pen tip in the center of the menu. The second into-range transition occurs when the pen tip comes into range when it is within the boundary 30 of the tracking menu 10.

In state 1 the pen cursor moves freely about within the menu 10 and the menu 10 stays stationary. During this movement of the pen cursor within the menu 10, the system performs conventional operations, such as highlighting buttons or controls over which the cursor passes by comparing the position of the cursor to positions of the buttons. However, if the pen is lifted out-of-range the state moves to state 0 (the pen tracking becomes inactive), if the pen encounters an edge as it moves, state 1E is entered and if the pen touches the tablet surface state 2 is entered.

To enter state 1E the position of the pen cursor (or pen tip transducer position) is conventionally compared to the position of the edges or boundary 30 of the tracking menu 10. When a match occurs, the cursor has hit the edge and the state 1E is entered. In state 1E, as long as the cursor is at or in contact with an edge as the cursor moves, the tracking menu (semi-transparent) is moved along with the cursor. That is, as the cursor is moved, the menu 10 is conventionally redrawn with the cursor at the edge of the tracking menu. In state 1E, if the pen is lifted out-of-range the state moves to state 0, if the pen moves away from an edge to reenter the interior of the menu the state moves to state 1 and if the pen touches the tablet, state 2 is entered.

As discussed above, state 2 is entered when the pen touches 46 the tablet surface while in state 1 or state 1E. In this state the pen is active or activated such that it will cause some function to be performed. In state 2 the active pen can be selecting a button, in which case the function of the button is performed, such as selection of a new. The tracking menu does not have to become transparent while in state 2. The controls or buttons of the present invention can be designed to work such that when you press on them, they show some highlighting and the assigned function is executed only on pen-up. This allows the user to cancel their action by moving off of the button while in the pressed state and thus preventing the triggering of the function. Or the active pen can be moving while under the control of a previously selected function, such as painting with a previously selected paintbrush or zooming based on a previous selection of a zoom tool/function. In state 2, the tracking menu 10 is made fully transparent. In this state, the system can continue to reposition the fully transparent menu under the cursor or preferably the menu can be allowed to remain in it's last position as in state 0 (note the user would not perceive a difference between these two alternatives). When the pen is lifted from the tablet surface and contact with the tablet ends, the tracking mode 42 is again entered and the menu 10 is repositioned 48 depending on the last state. If the pen is lifted when the prior state is state 1E, the pen is repositioned 48 at the last edge point of state 1E. If the pen is lifted when the prior state is state 1, the pen is repositioned 48 at the last interior point of state 1.

Additional details concerning tracking operations can be found in the related application previously noted.

Figure 4:
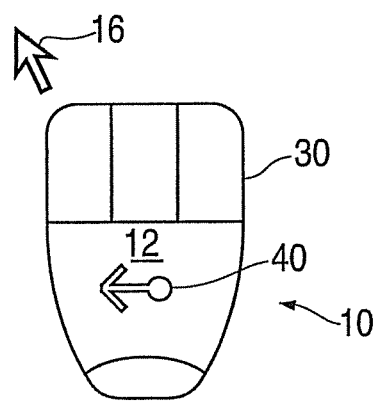
FIG. 4 shows a pen cursor moving within the pen-mouse.
Figure 5:
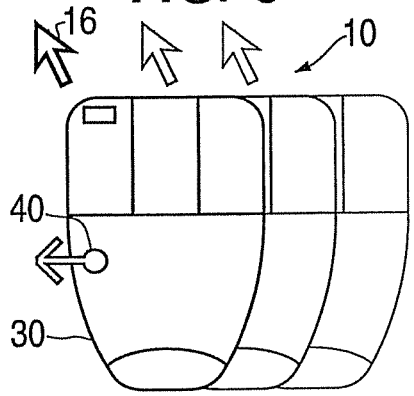
FIG. 5 shows the pen cursor moving the pen-mouse.

FIG. 4 illustrates a pen cursor or pen transducer location symbol 40 moving to the left within the tracking boundary 30 of the pen-mouse 10 and the pen-mouse 10 remaining stationary. That is, within the body of the virtual mouse 10, movement of the sensed position 40 of the input transducer does not cause the tracking menu 10 to move. In FIG. 5 the moving cursor 40 has encountered or hit the boundary 30 when moving to the left and the encounter with the boundary causes the pen-mouse 10 to move to the left. That is, movement of the tracking menu 10 occurs when the sensed position of input transducer 40 hits the tracking menu border 30 while the input transducer is in a "tracking state" (i.e., not during a mouse down state).

Figure 6:
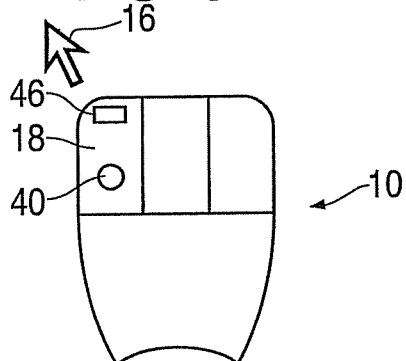
FIGS. 6 and 7 show a button being highlighted and selected.
Figure 7:
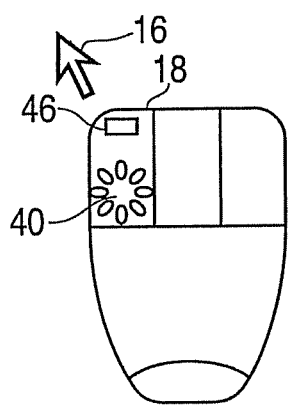

As depicted in FIG. 6, moving the input transducer 40 over the left mouse button graphic 18 causes this sub-component to "highlight" (the faint bar 46 at the top of the left mouse button 18). Note that the input transducer 40 is still in the "tracking" state not a "mouse button down" state. A mouse down event (pen down over a mouse button) is depicted in FIG. 7. When a "mouse button down" state occurs with the input transducer (e.g., with a pen, the pen tip is engaged by a tapping down of the pen onto the digitizer or tablet surface), the action of the tracking menu sub-component is executed. Tapping typically implies both the pressing down and lifting up of a pen on a surface. Here, by mouse button down when a stylus is involved is meant that the pen tip comes in contact with the surface. In this case, an event for the left mouse button 18 is generated, the bar 46 can be strongly highlighted, the pen down cursor position 40 can highlighted by a visible state change, such as the hot spot star shown in FIG. 7, to indicate that a hotspot action is occurring at the tip of the arrow cursor 16. That is, any object, such as a menu item, at the tip of the arrow cursor or tracking symbol 16 is activated.

The pen-mouse 10 of the present invention can not only provide the traditional simple mouse tracking symbol and single mouse button functions discussed above but can also provide more complicated functions as discussed below.

Positioning the input transducer 40 over the body 50 of the mouse 10 can cause a pan tracking symbol 52 to appear as depicted in FIG. 8. A pen down event within the mouse body subcomponent 50 of the tracking menu 10 can cause the tracking symbol 40 to change to a more bold visual state as shown in FIG. 9. In this condition with the pan function activated, a mouse drag event (dragging the pen tip over the surface of the tablet PC or digitizer while the pen tip is touching the surface) within the mouse body 50 causes the tracking menu 10 to be dragged a distance and direction corresponding to the transducer 40 motion as illustrated in FIG. 10.

Figure 14:
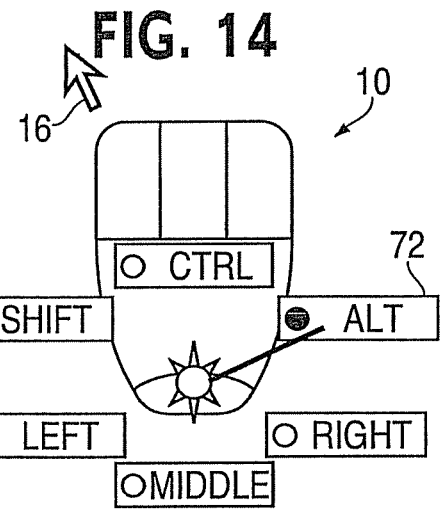
Figure 15:
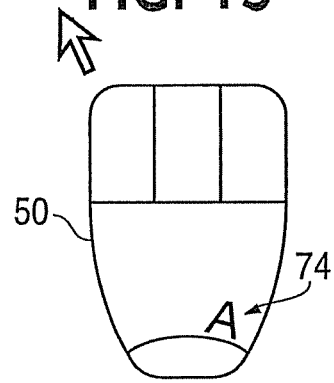
Figure 16:
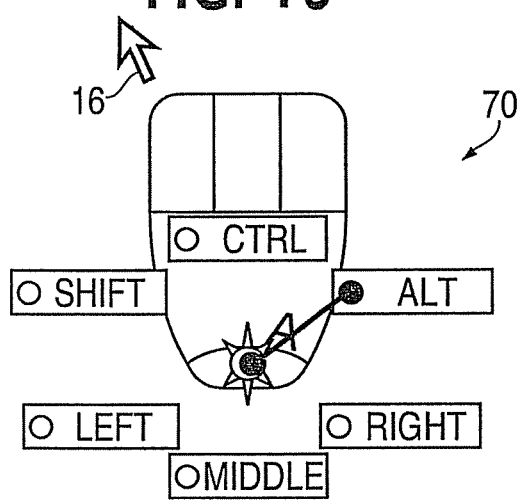
Figure 17:
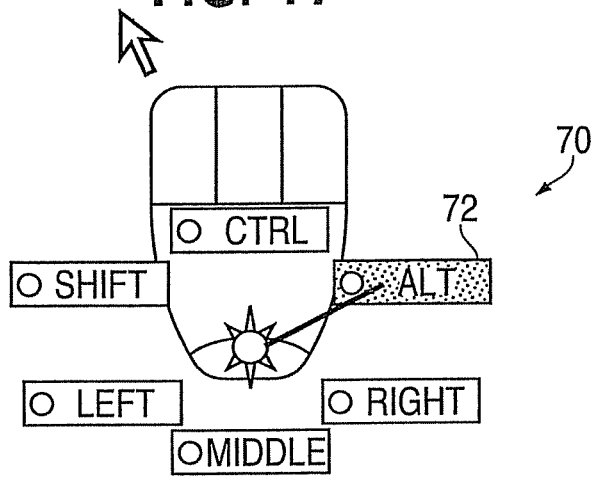
Figure 18:
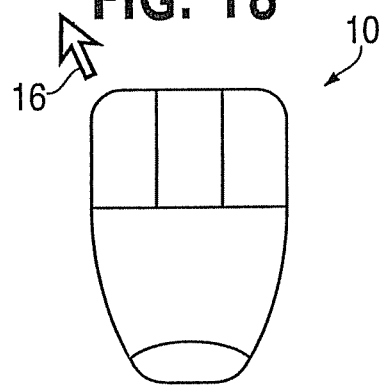
Figure 19:
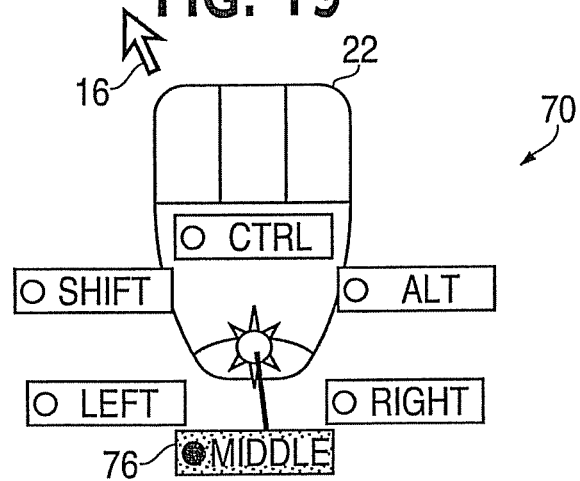
Figure 20:
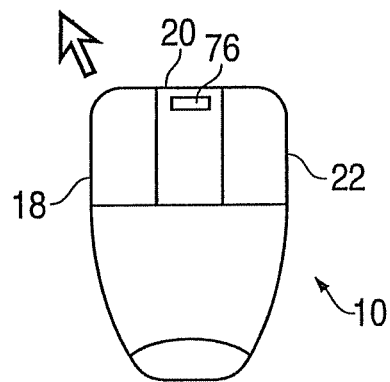
Figure 21:
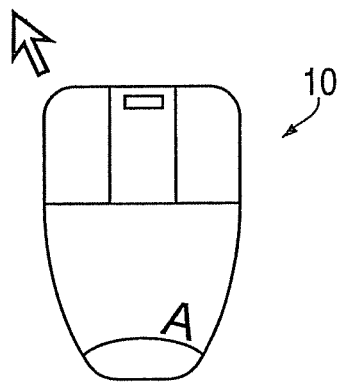
Figure 22:
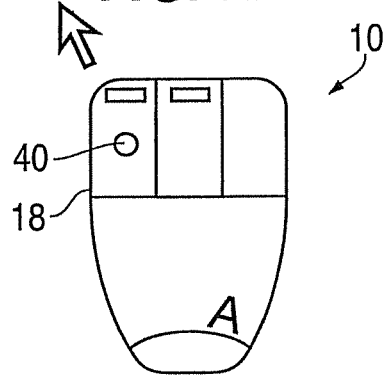
Figure 23:
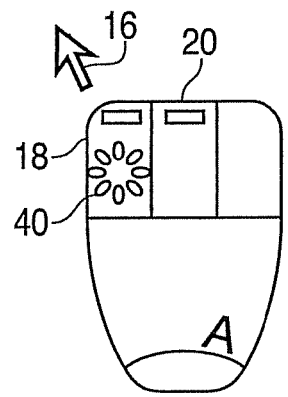

Positioning the input transducer 40 over a bottom tab 60 of the pen-mouse 10 can causes a bar tracking symbol 62 to appear (see FIG. 11) indicating the user is over this subcomponent. Once again, a mouse down event within the mouse bottom tab subcomponent 60 of the tracking menu 10 causes the pen tracking symbol 40 to change to a more bold visual state (see FIG. 12) and invokes the subcomponent action. In this case, the subcomponent action, as illustrated in FIG. 13 is to invoke a set of marking menus 70. The behavior of the menus 70 matches that of the traditional marking menus. In FIG. 14, we see the user selecting "Alt" 72 which is a "checkbox" item (i.e., remains enabled until the "Alt" item is explicitly selected again to toggle the state off). A pen-up event over the "Alt" menu item turns "Alt-lock" on and feedback is provided on the body of the mouse (the "A" character 74 of FIG. 15). A pen-down on the bottom tab again brings up the marking menu 70 (see FIG. 16). Selecting Alt 72 again (see FIG. 17) turns off "Alt-lock" (see FIG. 18). Selecting "Middle" 76 from the marking menu 70 (see FIG. 19) can turn on a "Middle-lock" (see the bar 76 of FIG. 20 indicating this state) that results in always generating a corresponding middle button mouse down/up event when any of the virtual pen-mouse buttons are engaged for a down/up action (see FIG. 19). FIG. 20 shows both "Middle-lock" and "Alt-lock" turned on. Hovering the pen 40 over the left button 18 in this mode (as depicted in FIG. 22) followed by a pen-down on the pen-mouse 10 left mouse button 18 in this mode can cause left mouse button 18 and middle mouse button events to be generated as depicted by the highlighted pen cursor symbol 40 of FIG. 23. This pair of events is focused on any object at which the arrow cursor 16 is pointing. That is, initiating an event that requires a two button "click" on a mouse can be accomplished using the pen-mouse 10 of the present invention.

Figure 24:
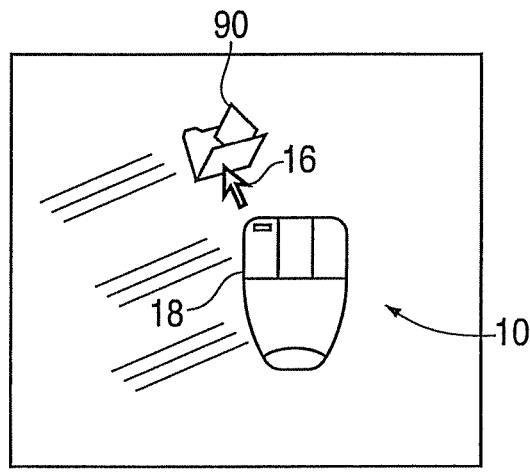
FIG. 24 shows object dragging with the pen-mouse.

FIG. 24 depicts a left mouse button drag event in progress. In this operation, the user has positioned the arrow cursor 16 on top of the "Folder" icon 90 and has engaged the left mouse button 18 of the pen-mouse 10 and begun dragging the pen 40 across the tablet while the tip is touching, thereby dragging the pen-mouse that drags the folder 90.

Figure 25:
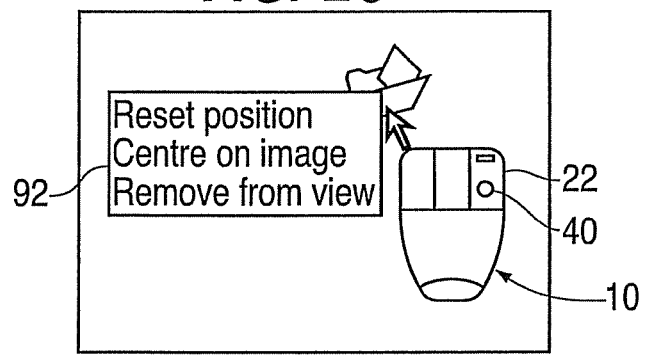
FIGS. 25 and 26 depict linear menu activation and selection.
Figure 26:
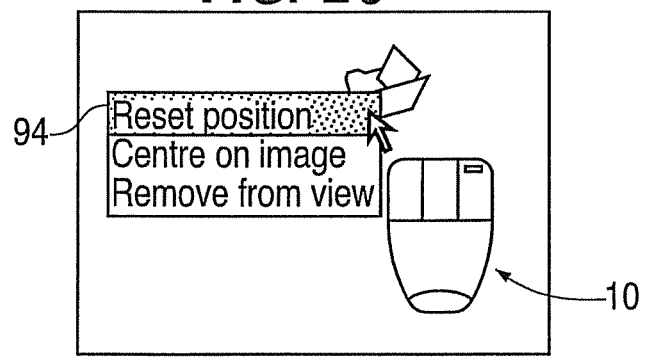

In FIG. 25 the user has engaged the right mouse button by placing the tracker symbol 40 over the right mouse button component 22 of the pen-mouse 10 and performing a down event with the input transducer. This results in a pop-up menu 92 appearing, in this case to the left of the arrow cursor. FIG. 26 shows dragging the pen downward (see the moved position of the highlighted pen tracking symbol as compared to FIG. 25) and this causes various menu items to highlight (in this case the "Reset Position" item 94) as one would expect. That is, the menu 10 can behave like a standard pop-up menu.

Figure 27:
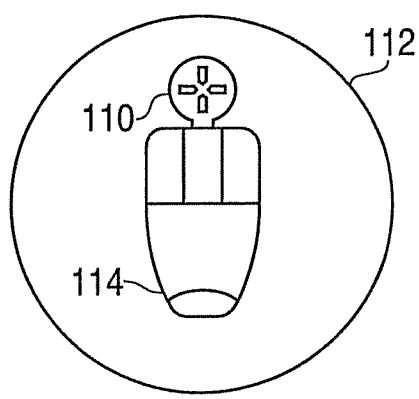
FIG. 27 illustrates a tracking boundary not coinciding with the body graphic.

The pen-mouse of the present invention need not use the arrow as the tracking symbol and can have a tracking menu boundary or edge that does not coincide with the visible edge of the mouse graphic. These alternatives are depicted in FIG. 27 where the pen-mouse tracking symbol 110 is a "hotspot" type symbol and the tracking menu border 112 is a circle much larger that the graphic 114.

The tracking symbol used with the pen-mouse, such as the arrow, can be positioned or oriented anywhere around the mouse graphic body. This choice in positioning can be designated by the user or managed by the system. For example, the system can move the arrow toward a display edge to allow easier selection of edge items. Examples of different positions for the symbol 120 are shown in FIGS. 28a-28g and the utility or usefulness of each position includes: 28a—screen top edge objects, 28b—left handed users and top right screen edge objects, 28c—right edge objects, 28d—bottom right edge objects, 28e—bottom screen edge objects, 28f—bottom left edge objects, and 28g—left edge objects.

Figure 29:
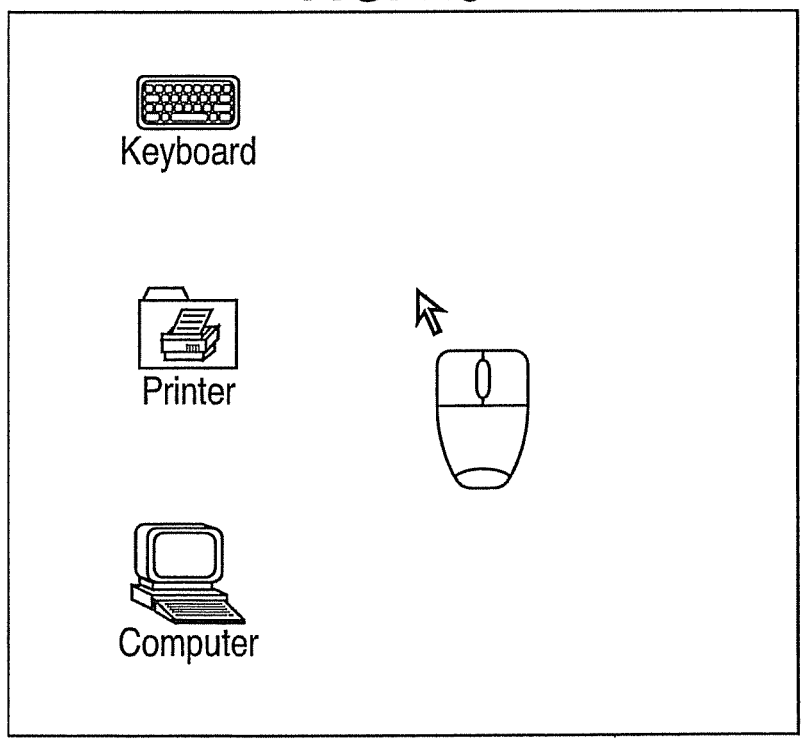
FIG. 29 depicts a different pen-mouse graphic with a wheel function.
Figure 28A:
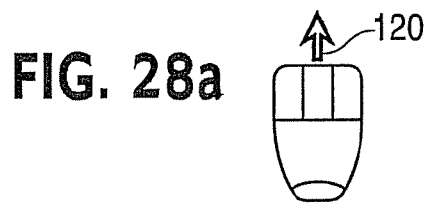
FIGS. 28*a*-28*g* illustrate different positions for the pen-mouse tracking symbol.
Figure 28B:
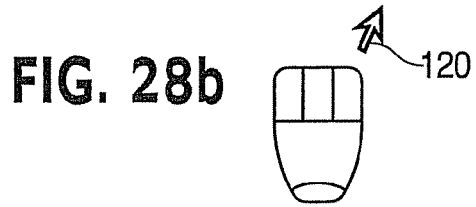
Figure 28C:
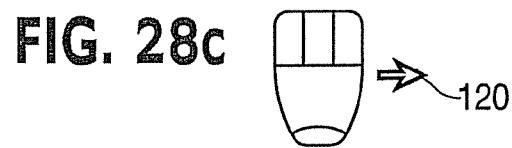
Figure 28D:
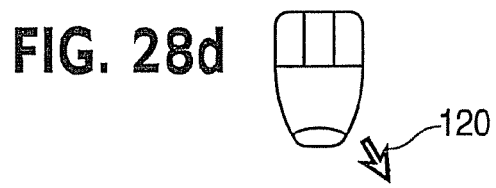
Figure 28E:
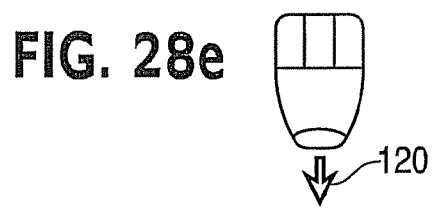
Figure 28F:
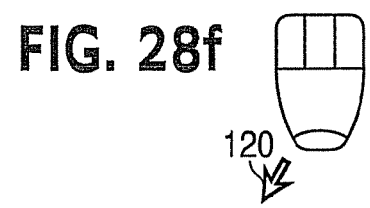
Figure 28G:
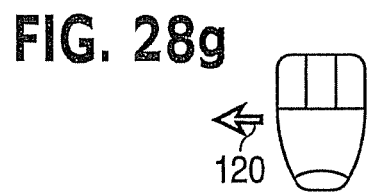

The pen-mouse can have a number of different appearances, shapes or body/graphic designs. FIG. 29 illustrates a pen-mouse 130 with a different shape and different functions including a wheel where the virtual wheel can be dragged up/down and the same actions as would occur when rotating a wheel are performed. FIG. 30 depicts a pen-mouse 140 where only the buttons 142 are shown, where the tracking symbol 144 is a predetermined distance from the buttons 142 and the tracking border or boundary 146 has additional space on the right. FIG. 31 illustrates a pen-mouse 150 with traditional L, M, R buttons and modifier keys. The tracking boundary 154 is depicted by a dashed line and coincides with the mouse graphic 156. This pen-mouse 150 includes a neck 158 attached to a base function region 60. The neck prevents the pen tracking symbol 162, a hot spot in this case, from accidentally triggering the functions of the base region 160. FIG. 32 shows a pen-mouse 170 shaped like an arrow or a dragable cursor with LMR buttons and an action hot spot at the tip 172 of the arrow. The pen tracking symbol 172 is shown in the body.

FIG. 33 shows a pen-mouse 180 in which traditional changeable cursor states are shown. The tracking or action symbol 182 may also change as a function of the system state.

The tracking symbol may also not change and rather only the system cursor changes which is attached to the tracking menu mouse body.

Figure 34:
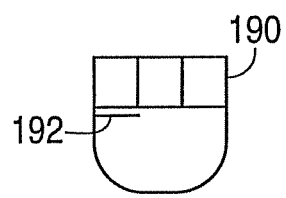
FIG. 34 shows an interior tracking wall.
Figure 35:
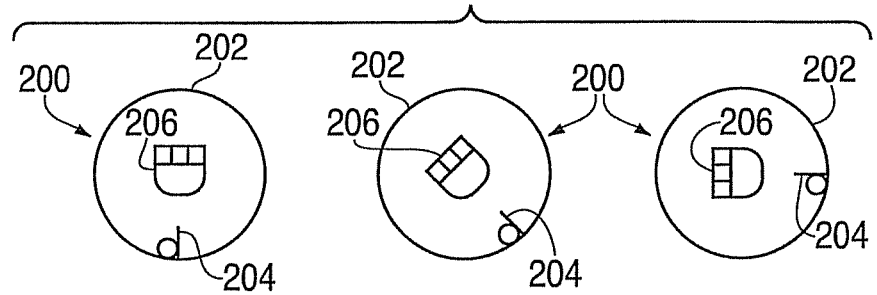
FIG. 35 shows a wall being used to provide track ball functionality.

FIG. 34 depicts a pen-mouse 190 that includes an interior tracking wall 192 jutting from the tracking boundary that coincides with of the pen-mouse graphic. When the pen tracking cursor encounters this wall 192 the pen-mouse is moved similarly to the cursor encountering the exterior tracking boundary. FIG. 35 illustrates a pen mouse 200 with a tracking boundary 202 having tracking wall 204 extending into the interior and that rotates the mouse graphic 206 when the pen cursor 208 encounters the wall 204. This allows the pen-mouse 200 to function like a virtual track ball.

Figure 36:
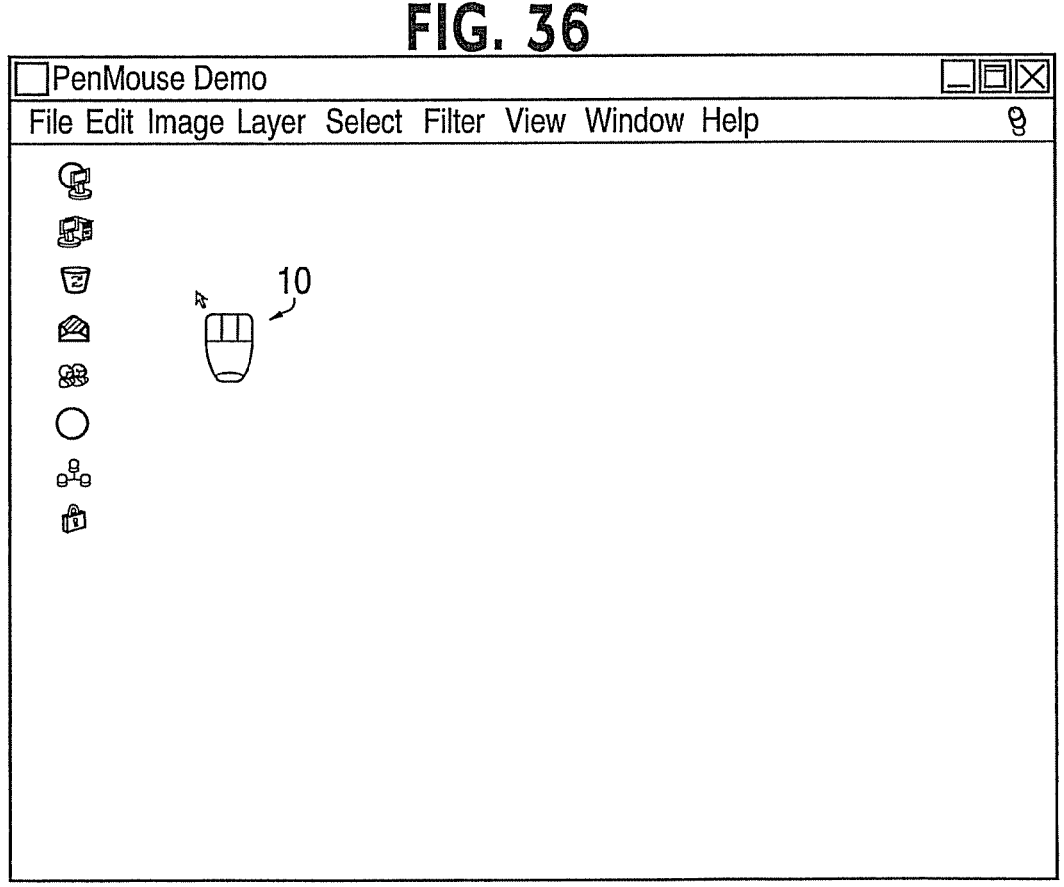
FIG. 36 shows pen-mouse relative size.

When the pen-mouse 10 of the present invention is displayed on a typical pen based computer display, the pen-mouse 10 is preferably displayed at a size similar to other tools of computer display as shown in FIG. 36. When the pen-mouse 10 is moved about on the display is preferably maintained on top of all objects in the display including menus and other persistent objects.

Figure 37:
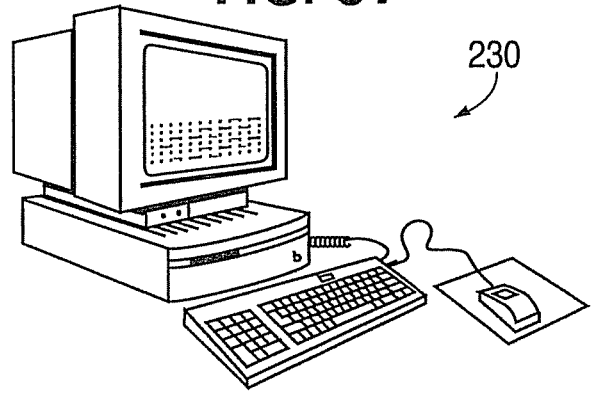
FIG. 37 shows a desktop PC as hardware of the present invention.
Figure 38:
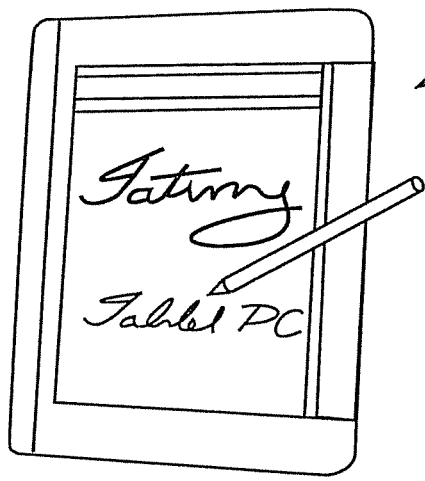
FIG. 38 depicts a tablet PC as hardware of the present invention.
Figure 39:
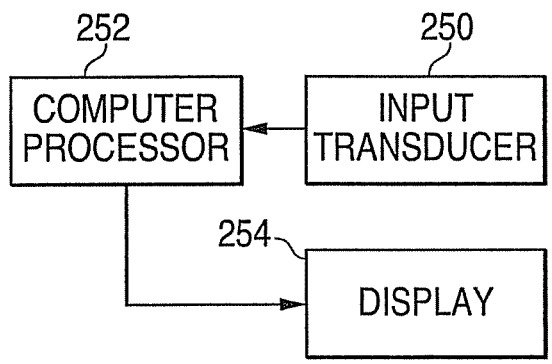
FIG. 39 shows components of the hardware of the present invention.

The hardware of the pen-mouse tracking menu system can be within a desktop PC 230 (see FIG. 37) or within a handheld device, such as a tablet PC 240 (see FIG. 38) or a PDA, and includes an input transducer 250 the position of which is tracked by a computer 252 that processes the transducer positions and creates the tracking menu display that is presented on a display 254 as shown in FIG. 39.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with respect to using a tablet type personal computer. The present invention is also suitable for other types of systems including large display formats (front and rear projection) both horizontal and vertical large displays, such as electronic whiteboards. Other input devices than a pen can also be used. For example, an audience could be viewing a large display presentation and if a user wants to manipulate the display from their seat, they could use a laser pointer type device. Here the pen tip down event would be generated by a dwell event or a secondary button on the laser pointer. The present invention has also been described with respect to a single input device being used with the system. The invention is also operable with two or more PenMice active at the same time, driven by two or more input devices. This allows two handed interaction techniques or collaborative multi-user applications.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A graphical user interface of a computer, comprising:
the computer configured to execute:
providing a pen cursor tracking graphic configured to function as mouse pointing and mouse button emulation including left, middle and right buttons; and
enabling a function of the mouse pointing when detecting a location of a pen cursor to be outside a boundary of the pen cursor tracking graphic, while the mouse button emulation selectively tracks a position of the pen cursor based on a contact state of the pen cursor.

2. An interface as recited in claim 1, wherein the graphic provides an appearance of button controls.

3. An interface as recited in claim 1, wherein the pen cursor tracking graphic provides mouse pointing and mouse button clicking emulation.

4. An interface as recited in claim 1, the graphic provides a two-button click by locking one of the buttons and accepting input through another button.

5. A graphical user interface of a computer, comprising:
the computer configured to execute:
providing a graphic dragable by an input cursor and that is used to interpret left, middle and right events associated with the input cursor as mouse events, and
enabling a function of a mouse pointer when detecting a location of the input cursor to be outside a boundary of the graphic, while the graphic selectively tracks a position of the input cursor based on a contact state of the input cursor with a surface of a display.

6. An interface as recited in claim 5, wherein the graphic is dragable by the input cursor controlled by an input device.

7. A method, comprising:
producing, by a computer, a graphical user interface on a display that has an appearance of a computer mouse having left, middle and right buttons;
moving, by the computer, the graphical user interface on the display as a tracking menu responsive to movement and a contact state of a pen when a cursor moved responsive to the pen encounters a boundary of the tracking menu; and
interpreting input events by the computer initiated by the pen as left, middle and right button mouse events using the graphical user interface in correspondence with a location of the cursor relative to the boundary.

8. An apparatus, comprising:
a display;
a pen type input transducer; and
a computer coupled to the display and transducer and providing a tracking menu having an appearance of a mouse with left, middle and right buttons on the display and interpreting transducer input events as left, middle and right computer mouse input events, and
wherein the tracking menu selectively moves with a cursor controlled by the pen type input transducer in correspondence with a location of the cursor relative a boundary of the tracking menu and a contact state of the pen type input transducer with the display.

9. A non-transitory computer readable storage controlling a computer to execute an operation via a tracking menu having an appearance of a mouse with left, middle and right buttons on the display, the operation comprising:
interpreting transducer input events as left, middle and right computer mouse input events; and
selectively moving the tracking menu with a cursor controlled by the computer, where the interpreting and the moving are controlled in correspondence with a location of the cursor relative to a boundary of the tracking menu and a contact state of an input of the cursor with the display.

10. A non-transitory computer readable storage controlling a computer to execute an operation by producing a graphical user interface on a display that has an appearance of a computer mouse with left, middle and right buttons, the operation comprising:

moving the graphic on the display as a tracking menu responsive to movement of a pen when a cursor controlled by the pen encounters a boundary of the tracking menu and a contact state of the pen, and interpreting input events initiated by the pen as left, middle and right mouse events, where the interpreting and the moving are controlled in correspondence with a location of the cursor relative to a boundary of the tracking menu.

\* \* \* \* \*

UNITED STATES PATENT AND TRADEMARK OFFICE
CERTIFICATE OF CORRECTION

| | | |
|---|---|---|
| PATENT NO. | : 8,904,310 B2 | Page 1 of 1 |
| APPLICATION NO. | : 11/754019 | |
| DATED | : December 2, 2014 | |
| INVENTOR(S) | : George W. Fitzmaurice et al. | |

It is certified that error appears in the above-identified patent and that said Letters Patent is hereby corrected as shown below:

In the Specification

Column 1, line 11, delete "2003now" and insert -- 2003, now --, therefor.

In the Claims

Column 8, line 14, in Claim 5, delete "dragable" and insert -- draggable --, therefor.
Column 8, line 23, in Claim 6, delete "dragable" and insert -- draggable --, therefor.
Column 8, line 47, in Claim 8, after "relative" insert -- to --.

Signed and Sealed this
Nineteenth Day of May, 2015

Michelle K. Lee
*Director of the United States Patent and Trademark Office*